(12) United States Patent
Eatedali et al.

(10) Patent No.: US 11,985,371 B2
(45) Date of Patent: May 14, 2024

(54) SYSTEMS AND METHODS FOR CUSTOMIZING CHANNEL PROGRAMMING

(71) Applicant: Disney Enterprises, Inc., Burbank, CA (US)

(72) Inventors: Josiah Eatedali, Los Angeles, CA (US); Mark Arana, West Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 428 days.

(21) Appl. No.: 14/454,677

(22) Filed: Aug. 7, 2014

(65) Prior Publication Data

US 2016/0044356 A1 Feb. 11, 2016

(51) Int. Cl.
| | |
|---|---|
| *H04N 21/2668* | (2011.01) |
| *G06Q 30/00* | (2023.01) |
| *H04L 65/61* | (2022.01) |
| *H04N 21/25* | (2011.01) |
| *H04N 21/258* | (2011.01) |
| *H04N 21/262* | (2011.01) |
| *H04N 21/442* | (2011.01) |
| *H04N 21/45* | (2011.01) |
| *H04N 21/658* | (2011.01) |
| *H04W 4/80* | (2018.01) |
| *H04N 21/466* | (2011.01) |

(52) U.S. Cl.
CPC ......... *H04N 21/2668* (2013.01); *G06Q 30/00* (2013.01); *H04L 65/61* (2022.05); *H04N 21/251* (2013.01); *H04N 21/252* (2013.01); *H04N 21/25883* (2013.01); *H04N 21/25891* (2013.01); *H04N 21/26283* (2013.01); *H04N 21/44226* (2020.08); *H04N 21/4532* (2013.01); *H04N 21/6582* (2013.01); *H04W 4/80* (2018.02); *H04N 21/4667* (2013.01)

(58) Field of Classification Search
CPC ............ H04N 21/2668; H04N 21/251; H04N 21/252; H04N 21/25883; H04N 21/25891; H04N 21/26283; H04N 21/44222; H04N 21/4532; H04N 21/6582; H04N 21/4667
See application file for complete search history.

(56) References Cited

U.S. PATENT DOCUMENTS

| | | | |
|---|---|---|---|
| 6,774,926 B1 | 8/2004 | Ellis | |
| 7,543,322 B1 * | 6/2009 | Bhogal | H04N 21/435 725/46 |
| 8,910,201 B1 * | 12/2014 | Zamiska | H04N 21/44222 725/34 |
| 9,886,169 B2 * | 2/2018 | Higa | H04N 21/42204 |
| 2008/0052026 A1 * | 2/2008 | Amidon | H04N 5/23203 702/104 |
| 2008/0201731 A1 * | 8/2008 | Howcroft | H04H 60/46 725/13 |

(Continued)

*Primary Examiner* — Pinkal R Chokshi
(74) *Attorney, Agent, or Firm* — Farjami & Farjami LLP

(57) ABSTRACT

The present disclosure provides for systems and methods for customizing channel programming. The disclosed methods and systems utilize various data inputs, including affirmative user inputs, non-affirmative user characteristics, environmental data and/or temporal data to customize channel programming for a particular user or group of users. In a further aspect, the disclosed methods and systems provide for various social sharing of viewing experiences and channels by coordinating, broadcasting and/or sharing channels or viewing schedules with other users.

18 Claims, 4 Drawing Sheets

(56) References Cited

U.S. PATENT DOCUMENTS

| | | | |
|---|---|---|---|
| 2008/0242221 A1* | 10/2008 | Shapiro | G06Q 30/02 455/3.06 |
| 2008/0271080 A1* | 10/2008 | Gossweiler | G06F 3/0486 725/47 |
| 2009/0100468 A1* | 4/2009 | Shaffer | H04N 21/4147 725/41 |
| 2009/0133051 A1* | 5/2009 | Hildreth | H04N 5/4403 725/28 |
| 2010/0333138 A1 | 12/2010 | Klappert | |
| 2012/0054278 A1* | 3/2012 | Taleb | G06Q 50/01 709/204 |
| 2012/0110621 A1 | 5/2012 | Gossweiler, III | |
| 2013/0081085 A1* | 3/2013 | Skelton | H04N 21/252 725/46 |
| 2013/0139202 A1* | 5/2013 | Purpura | H04N 5/44543 725/43 |
| 2013/0179786 A1* | 7/2013 | Bolton, Jr. | H04N 21/4532 715/719 |
| 2013/0185750 A1* | 7/2013 | Ayoub | H04N 21/25841 725/34 |
| 2013/0291018 A1* | 10/2013 | Billings | H04L 51/32 725/46 |
| 2014/0229968 A1* | 8/2014 | Francisco | H04N 21/25875 725/16 |
| 2015/0012416 A1* | 1/2015 | Woods | G06Q 50/18 705/39 |
| 2015/0019342 A1* | 1/2015 | Gupta | G06Q 30/0269 705/14.66 |
| 2015/0163636 A1* | 6/2015 | Macleod | H04W 4/025 455/414.3 |
| 2015/0189356 A1* | 7/2015 | Shen | H04N 21/4122 725/34 |
| 2015/0237397 A1* | 8/2015 | Yamada | H04N 21/462 725/44 |
| 2015/0358661 A1* | 12/2015 | Navarro | H04N 21/2668 725/59 |
| 2016/0142783 A1 | 5/2016 | Bagga | |
| 2016/0337704 A1 | 11/2016 | Binder | |

* cited by examiner

|  | 7:00PM | 7:30PM | 8:00PM | 8:30PM |
|---|---|---|---|---|
| Custom ESPN 10 | ESPN Asset 12 | | ESPN Asset 14 | |
| Custom Disney 20 | Disney Asset 22 | Disney Asset 24 | | Disney Asset 26 |
| Custom ABC 30 | ABC Media Asset 32 | | ABC Media Asset 34 | ABC Media Asset 36 |
| Custom User A 40 | Digital Media Asset 42 | | Digital Media Asset 44 | |
| Custom Room 50 | Digital Media Asset 52 | Digital Media Asset 54 | Digital Media Asset 56 | Digital Media Asset 58 |

FIG. 2

CUSTOM CHANNEL
CREATION METHOD 300

SYSTEMS AND METHODS FOR CUSTOMIZING CHANNEL PROGRAMMING

TECHNICAL FIELD

The present disclosure relates generally to digital media, and more particularly to systems and methods for customizing channel programming.

SUMMARY OF THE INVENTION

The present disclosure may be embodied in a method comprising receiving scheduling factor data corresponding to a user; selecting a plurality of digital media assets from a set of available digital media assets according to the scheduling factor data; populating a custom channel with the plurality of selected digital media assets arranged in a particular order and scheduled to play on a user device at scheduled times based on the scheduling factor data, the plurality of selected digital media assets and scheduled times defining a custom broadcast schedule; and presenting a current digital media asset according to the custom broadcast schedule. The scheduling factor data may comprise preferences derived from one or more user characteristics. In a further aspect, the method may further comprise receiving updated scheduling factor data; and updating the customer broadcast schedule based on the updated scheduling factor data.

The user characteristics may comprise demographic information, shopping activity information, social media activity information, and/or viewing history information.

In a further aspect of this embodiment, the scheduling factor data may further comprise environmental data corresponding to the user's environment. The environmental data may comprise temporal data, weather information, and/or current events information. Temporal data may include time of day information, time of year information, and/or holiday information.

The present disclosure may also be embodied in a method comprising receiving scheduling factor data corresponding to a user; selecting a plurality of digital media assets from a set of available digital media assets according to the scheduling factor data; populating a custom channel with the plurality of selected digital media assets arranged in a particular order and scheduled to play on a user device at scheduled times based on the scheduling factor data, the plurality of selected digital media assets and scheduled times defining a custom broadcast schedule; and presenting a current digital media asset according to the custom broadcast schedule, wherein the scheduling factor data comprises environmental data corresponding to the user's environment. The environmental data may comprise temporal data, weather information, and/or current events information. Temporal data may include time of day information, time of year information, and/or holiday information. The scheduling factor data may further comprise user viewing history information.

In a further aspect, the method may further comprise receiving updated scheduling factor data; and updating the customer broadcast schedule based on the updated scheduling factor data.

The present disclosure may also be embodied in non-transitory computer readable media comprising an instruction set configured to command a computing device to carry out the methods described herein.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily to scale.

FIG. 2 provides an exemplary channel lineup in accordance with an aspect of an embodiment of the present disclosure.

DETAILED DESCRIPTION

Media content providers, such as television service providers, will often provide users with a schedule of upcoming programming via electronic program guides (EPGs). The electronic program guides are set in advance by content providers (usually the television networks) and provide users with advance notice of when certain programming will be aired so that viewers can plan in advance and catch their favorite shows. These electronic program guides are essentially electronic versions of previously popular paper programming guides, such as the TV Guide printed publications. However, these pre-set programming schedules require users to schedule their lives around the pre-set programming schedules, and fail to accommodate or make full use of the schedules or viewing patterns of individual users.

The present disclosure provides for systems and methods for customizing channel programming to create playlists and/or channels that are customized for a particular user or group of users, thereby maximizing the probability that the user will view the customized channel and its programming.

Figure 1:
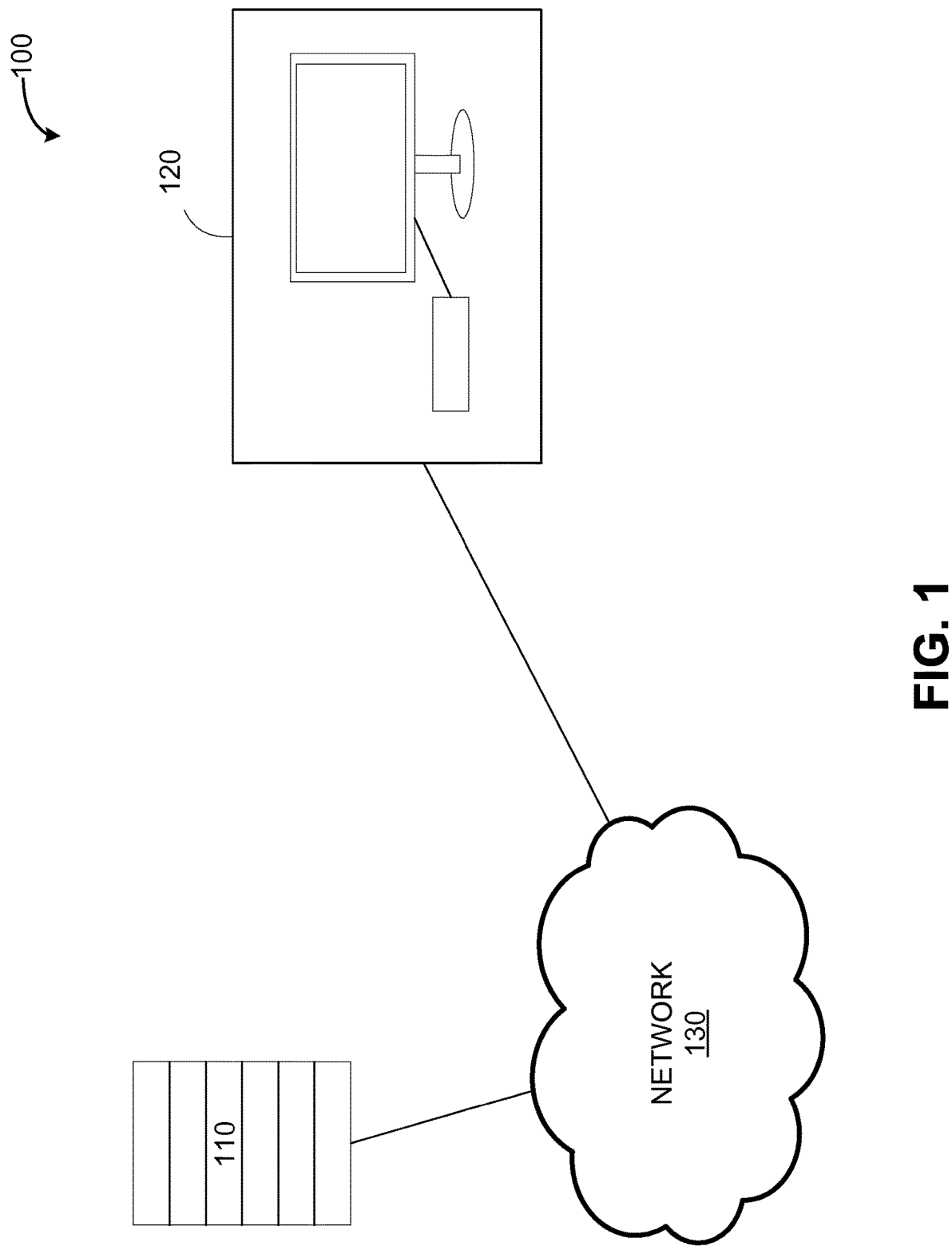
FIG. 1 provides a digital media distribution network in accordance with an aspect of an embodiment of the present disclosure.

FIG. 1 provides a representation of a digital media distribution network 100. The digital media distribution network 100 may be any network over which digital media is delivered to a user, including a media service provider (such as a television broadcast network), a media streaming service, a media cloud storage service, or the like. The digital media distribution network 100 includes a remote server 110 and a user entertainment system 120 connected over a wide-area network 130, such as a satellite and/or cable broadcast network, wireless network, or the Internet. The user entertainment system 120 is any device on which the user can experience digital media, examples of which may include a tablet, a smart phone, other mobile devices, a Blu-Ray or DVD player or other home entertainment system, a personal and/or laptop computer, a home gaming system, or the like. The remote server 110 may be any data server that is used to provide and/or store digital media content. For example, the remote server 110 may store content belonging to a particular content broadcaster (e.g., a television network such as ESPN or a media streaming network such as YouTube) that is transmitted to user's entertainment system 120. Alternatively, the remote server 110 may store content owned by a user (e.g., a cloud storage service) such that the user can remotely store their media content and access it when desired. It should be understood that FIG. 1 is a simple block representation of a content distribution network, and each of the different components may comprise numerous components or modules to carry out the functions described herein. For example, there may be numerous remote servers, and different remote servers may play different roles (e.g., storing content, providing content for streaming, storing user purchase information, providing user interaction interface, etc.). Similarly, the user's local entertainment system 120 may comprise numerous components and may comprise numerous devices through which a user can experience digital media. In certain embodiments, the user entertainment system 120 may also comprise a local network for storing, transmitting, and receiving digital media between the various devices on a user's local network.

Media content providers generally provide electronic program guides based on pre-set programming schedules as determined by the various media content providers. A common example is a television network setting a program lineup with particular shows scheduled for particular times. This schedule is then provided to all subscribed users so that they are aware of when certain shows will be playing. In the presently disclosed systems and methods, programming schedules are customized for particular users based on one or more scheduling factors in order to maximize the probability that a user will be interested in the programming and make a decision to view the scheduled programming. The disclosures provided below and any specific examples provided are meant to be exemplary situations that provide description by way of example and should not be read to limit the present disclosure. As such, while many of the example situations will be given with reference to television programming, it should be understood that the present disclosure may be applied to any digital media programming, including playlists and/or schedules of visual content, audio content, audio/visual content, and the like.

Using information collected about the user, the user's preferences and surroundings, and other scheduling factors, an individual user's scheduled programming can be customized to maximize the probability that the user will view the programming. Customized programming may be performed dynamically to respond to any changes in the scheduling factors. Three categories of scheduling factors, or triggers, will be discussed in greater detail below: affirmative user actions, non-affirmative user characteristics, and environmental/temporal factors.

In a first aspect, affirmative user actions may be used to provide customized programming. By collecting data and observing a user's viewing habits, certain patterns and viewing tendencies can be gathered to inform scheduling decisions for a user's customized programming. This data may include a user's previously watched shows or favorite genres. The information may be fairly broad, e.g., User A enjoys watching sporting events, or much more granular, e.g., User A enjoys watching Los Angeles-based sports teams, but only when games are broadcast in the evenings between 6:00 and 10:00 PM. By taking this information into account, the customized channel programming may schedule those shows that a user has previously indicated an interest in watching, rather than providing scheduled show after schedule show for which the user has never expressed any interest and has zero probability of watching. The local entertainment system 120 may comprise various input devices so as to receive affirmative user action data, such as a remote control, keyboard, mouse, joystick, touchpad, smartphone, etc., and user action data may be stored either locally by the local entertainment system 120 or stored in a remote server on the network 130.

A user's non-affirmative actions and characteristics may also be used to derive preferences that can be used to customize the user's programming. For example, this category might include demographic information (age, gender, geographic data, income, etc.) or other user-specific characteristics. These user characteristics can be used to indirectly derive user viewing preferences based on similar individuals or the user's interests. A user's non-affirmative actions and characteristics may be provided via numerous input devices located in the local entertainment system 120. For example, the local entertainment system 120 may include biometric data inputs—e.g., retinal scanners, fingerprint scanners, infrared inputs—to identify and provide data about a user. Further, the entertainment system 120 may include near-field communication (NFC) or radio-frequency identification (RFID) inputs to identify certain products in the user's home and identify user interests based on those products. A user's preferences and characteristics may also be provided by third parties. Third parties may provide information and insight into users' viewing habits and tendencies that cannot be measured directly by the user's entertainment system 120. Some examples might include user interactions with their social network circles, content that they have liked or followed on social media, user shopping data and recently viewed products, etc. The network 130 may include various information sources such as social media networks or online marketers and other data providers to provide data about a user's interests and activities.

Finally, environmental factors may be used in customizing a user's programming. These factors generally include data that is external to a user and not specific to the user, but may have some relation or relevance to a user's viewing habits. Environmental factors might include temporal factors, such as the time of year or time of day. For example, a user's viewing history may be used in conjunction with temporal data to find that the user may prefer to watch more informational, news-type programming in the mornings, and less serious programming such as reality television in the evenings. A user's customized channel programming could take these preferences into account by scheduling particular types of programming at different times of day or different times of the year. Environmental factors might also include holidays, weather, current events, etc. Examples might include programming a user's favorite Christmas movies during the winter holidays, or programming particular types of content that the user enjoys viewing when it is raining, or programming breaking news specific to the user's geographic region, etc. Once again, environmental factors may be provided via input devices connected to the user's entertainment system 120 or from third party sources on the network 130. As discussed above, RFID, NFC, or other input devices in the entertainment system 120 may collect information about a user's home or environment that provide insight into a user's interests and viewing habits, and third party news sources and/or social media data provided over the network 130 may provide updates as to current events relevant to the user.

The numerous input devices and information sources and the different scheduling factors or triggers discussed above may be used together to determine a programming schedule that maximizes the probability that the user will watch. An example will now be provided to demonstrate how these different triggers may be used to customize user programming. When a user begins watching TV, the user may identify him or her-self, or they may be automatically identified (e.g., via an input device such as RFID, NFC or biometric data). The identified user's viewing profile is loaded and used to inform programming decisions to maximize their viewing probability. The user's viewing profile might include affirmative actions by the user, such as his or her previously viewed shows, so that the user's favorite shows or movies, or similar shows or movies, can be scheduled. If a user has already viewed a particular episode or movie recently, then that media content may be excluded from the schedule, unless the user has demonstrated a propensity for re-watching that particular media content.

A user's non-affirmative characteristics may also be used to further inform the programming decisions. For example, a user's social media footprint may be used to distinguish those shows that a user has watched and enjoyed versus those shows that a user has watched and has no interest in pursuing further (e.g., a positive comment, a Twitter follow or a "Like" on Facebook). A user's non-affirmative characteristics can also be used to determine shows that the user may be interested in based on the user's demographic data or popularity among the user's social circles, even if the user has not affirmatively demonstrated any interest in the show.

Environmental and temporal factors may also be used. For example, temporal factors may be used to determine the optimal time to play a particular show. A user may be more likely to watch serious programming about financial markets in the morning, and more likely to watch less intense viewing in the evenings before bed. A user may also be more likely to watch a Christmas movie in December than in August. Environmental factors may be used to provide information about a user's interests, e.g., via RFID or NFC identification of products in the user's home or third party data regarding products recently viewed online by the user. Environmental factors such as current events may also inform programming decisions. For example, programming may be adjusted dynamically based on current events that could not previously be predicted (e.g., if the local sports team wins a championship, the programming may be updated to show the championship celebration coverage, or if the local sports team loses the championship, programming may be updated to not show any sports coverage for the remainder of the week; alternatively, if the user has no interest in local sports, this event may have no effect at all on the user's scheduled programming). While scheduling factors may be used to determine which programming to include in a user's viewing schedule, scheduling factors may also be used to exclude certain content. Environmental factors such as severe weather may result in movies or shows depicting severe weather being excluded (e.g., do not schedule the film "Twister" to be played during tornado season in tornado-heavy regions).

Programming may be updated dynamically to instantly respond to changing conditions. It may be desirable not to interrupt current viewing, so any updates to programming might be constrained to programs scheduled after the currently playing media content. Similarly, the user may look at the current schedule and decide that they want to keep the programming schedule as it is currently arranged. As such, the user may be presented with the option of updating their programming, or leaving the programming as it is.

While the above disclosure discussed programming triggers in three general groups (affirmative, non-affirmative, environmental), it should be appreciated that any data that may provide insight into a user's viewing decisions or viewing probability may be used to customize programming. This data might include, but is not limited to, geolocation, time of year/seasonality, time of day, day of the week, current events, current or forecasted weather, bio-data such as heart rate, body temperature, physical activity, number of people in the room, presence or absence of children, stated or derived preferences, account information, available $3^{rd}$ party information (shopping habits, social media, etc.), activity of friends and family, activity of prominent figures and celebrities, etc.

The customized programming determination may be performed by any node within the media distribution system 100. Customized programming may be performed remotely, e.g., at the remote server 110 by the media content provider, and the scheduled programming pushed to the user's local entertainment system 120. Alternatively, the customized programming determination may be performed locally on the user's local entertainment system 120. In this scenario, the content may then be pulled from the remote server 110 to the local entertainment system 120 based on the determined programming, or the custom program guide can be pushed out to the remote server 110 so that the appropriate programming can be pushed from the remote server 110 to the local entertainment system 120.

It should further be appreciated that differing sets of rules or calculations may be used to create multiple customized channels and provide a variety of customized programming channels for one or more users. FIG. 2 depicts a sample customized channel lineup 200. The lineup 200 shown in FIG. 2 includes five sample custom channels 10, 20, 30, 40, 50. Each of the sample custom channels 10, 20, 30, 40, 50 has media content scheduled to be played at particular times. For example, custom channel 10 (Custom ESPN) has a first digital media asset 12 currently playing (at 7:00 p.m.), and a second digital media asset 14 scheduled to played at 8:00 p.m. once the first digital media asset 12 is completed. Each digital media asset comprises one or more discrete pieces of digital media content. The other custom channels 20, 30, 40, and 50 are similarly populated with scheduled digital media assets (22, 24, 26, 32, 34, 36, 42, 44, 52, 54, 56, 58).

Each of the custom channels 10, 20, 30, 40, 50 may be populated with digital media assets based on a particular set of rules and scheduling factors. If User A is the television subscriber, then the channel Custom ESPN 10 may be based on User A's user profile, which includes scheduling factor data discussed above, such as User A's viewing history and preferences, social network data, temporal data and environmental data, etc. Based on the scheduling factor data available, Custom ESPN 10 is populated with digital media assets that are owned by ESPN and (ESPN Asset 12 and 14) which maximize the potential that User A will watch ESPN's programming. For example, the ESPN family of networks (ESPN, ESPN2, ESPNNews, etc.), may have live broadcasts of several sporting events or sports news, and may also have stored additional media assets that may be recalled and played at any time, such as recordings of past broadcasts or previously aired shows, or any other content for which ESPN has distribution rights. In populating the Custom ESPN 10 channel, the scheduling factors may be used to determine which of ESPN's vast array of digital media assets would maximize the potential that User A will tune into the scheduled program at the scheduled time. Similar determinations may be made using Disney's media assets for the Custom Disney channel 20, or ABC's media assets for the custom ABC channel 30.

Further, since Disney is the parent company to both ESPN and ABC, the media assets available to populate the Custom Disney channel 20 may overlap with custom channels 10 and 30. In this case, the scheduling determinations may take these factors into account to avoid showing the same media asset simultaneously on these channels, thereby increasing the likelihood that the user will tune into at least one of the Disney-owned channels.

Further, users may be able to create their own custom channels which are not constrained by any particular provider, such as Custom User A channel 40. Such a channel may be able to utilize every media asset available to the user and provide content based on user-specified rules in conjunction with the scheduling factors discussed above to determine which media asset the user is most likely to watch. For example, the custom channel Custom User A 40 may choose digital media assets from every live television network broadcast to which the user is subscribed, and also from digital media assets owned by the user or otherwise available to the user.

Rather than being directed by a single user's user profile, scheduling determinations may also be based on multiple user profiles. For example, if it is determined that there are multiple people in a room, a custom channel Custom Room 50 may use the user profiles of each individual in the room (or a subset of these individuals) to make scheduling decisions so as to maximize the probability that the entire group will decide to watch a particular digital media asset. In a simplified example, if Users A and B are both in a room, and User A enjoys comedies and action films, while User B enjoys comedies but hates action films, then the custom channel Custom Room 50 may opt to schedule comedies, and not to schedule any action films, while both Users A and B are in the room.

When a user accesses a custom channel, they may be presented with what is "currently playing," similar to a user's experience when browsing through traditional, non-customized television channels. Similar to a traditional television channel, a user might turn to a custom channel in the middle of the "currently playing" digital media content, i.e., at some point within the digital media content other than its beginning.

In one embodiment, a user's custom channel (or channels) can be broadcasting on their local home network at all times. In a particular aspect of this embodiment, it may be preferable to perform such transmission using a user datagram protocol (UDP) transmission so as to minimize local bandwidth consumption.

Alternatively, since a particular user's custom channel is specific to a particular user, there may be no need to continuously "broadcast" the channel when the user is not watching. However, in order to simulate a broadcast channel experience, the "broadcast" aspect may be simulated by populating a custom channel and creating a custom broadcast schedule, so that when the user turns to the digital library channel, the "currently playing" digital media asset will begin playing at the correct position based on the custom channel's pre-set schedule. One way in which this embodiment may be implemented is by using time data based on the custom schedule to jump to the particular timecode corresponding to where the movie playback should be according to the custom broadcast schedule. For example, with a 2-hour movie starting at 6 PM, if a user tunes into the channel at 7:05 PM, the user device could request the appropriate media content from the appropriate source (e.g., from the content provider's servers, or, if it is media owned by the user, then the user's local and/or remote media storage device), and begin playback at the 65-minute mark.

In yet another alternative embodiment, the custom channel may re-populate every time the user turns his or her entertainment system on, and the "broadcast" aspect may be simulated by randomly assigning a start point to the first media content asset that plays.

Although the "broadcast" aspect discussed above may be desirable to make the user feel as if they are viewing an actual television channel, the general goal is to improve the user viewing experience and incentivize them to view content. As such, the user may be provided with additional flexibility in how they access, view, and interact with their digital content. For example, when a user tunes into a custom channel (or at any point during the user's viewing of a custom channel), a user may be presented with the option to either view the "currently playing" media content from its current position, or, alternatively, to view the currently playing media content asset from its beginning. Further, once a particular media content asset ends, a user may be provided with the option to move to the next media content asset scheduled to be played in the custom channel, or the user may also be presented with the option to view other, related content, possibly from the same content provider. For example, the Disney custom channel 20 may be scheduled to play Iron Man, and then Pocahontas. If the user turns to the channel and watches Iron Man, when the film completes, the user may be presented with the option to continue viewing the next scheduled media content asset (i.e., Pocahontas), or to view one or more related media content assets by the same content provider, such as Iron Man 2 or Avengers.

If a user chooses to take an action that somehow alters the custom channel's broadcast schedule (e.g., starting the media content from the beginning rather than its current/scheduled position, or to view related content rather than the originally scheduled content), then the custom channel may automatically update and re-populate based on the user's selections.

In a further aspect of this disclosure, users are able to share their custom channels with one another such that users can view each other's custom channels, such as the title of a digital media asset playing now in the channel and a list of digital media assets that are scheduled to play in the future. Users may also create community events where multiple users can schedule simultaneous viewing of a particular digital media asset on their respective entertainment systems. In this way, custom channels may be utilized to take advantage of the social nature of experiencing media, even when users do not physically gather in a single location to watch together.

Figure 3:
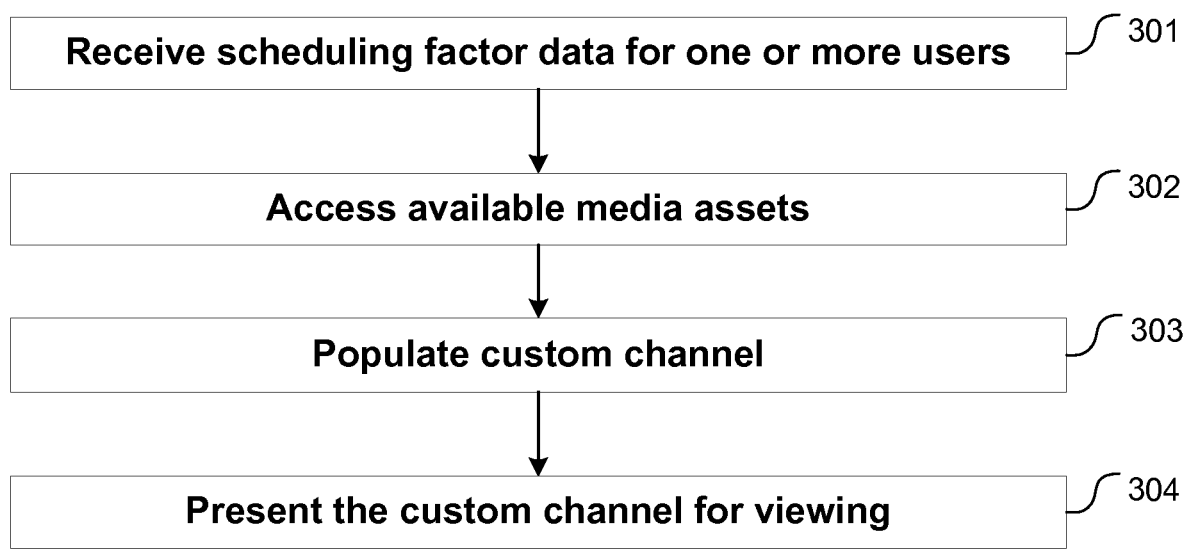
FIG. 3 provides a flow chart for a custom channel creation method in accordance with an embodiment of the present disclosure.

FIG. 3 provides a flowchart for a custom channel creation method 300 in accordance with an embodiment of the present disclosure. At block 301, the method comprises receiving scheduling factor data for one or more users. These factors help determine the media content to be included in a particular custom channel and how the media content is scheduled. These scheduling factors were discussed in great detail above, and are generally used to determine which media assets one or more users are most likely to view. Next, the method comprises accessing available media assets (302). As discussed above, the available media assets may vary depending on the custom channel. For example, a Custom ESPN channel might be limited to the digital media assets for which ESPN has distribution rights, whereas a user's custom channel might include all live broadcasts for which the user has a subscription, as well as any other media assets owned by the user or accessible to the user. Next, the method comprises populating the custom channel with media content from the available media assets according to the scheduling factor data (303). Finally, the method comprises presenting the custom channel for viewing (304).

It should be understood that while the figures have presented exemplary embodiments of the present systems and methods, revisions may be made to the disclosed systems and methods without departing from the scope of the present disclosure.

Where components or modules of the disclosed systems and methods are implemented in whole or in part using software, in one embodiment, these software elements can be implemented to operate with a computing or processing module capable of carrying out the functionality described with respect thereto. After reading this description, it will become apparent to a person skilled in the relevant art how to implement the disclosure using other computing modules or architectures.

As used herein, the term module might describe a given unit of functionality that can be performed in accordance with one or more implementations. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Figure 4:
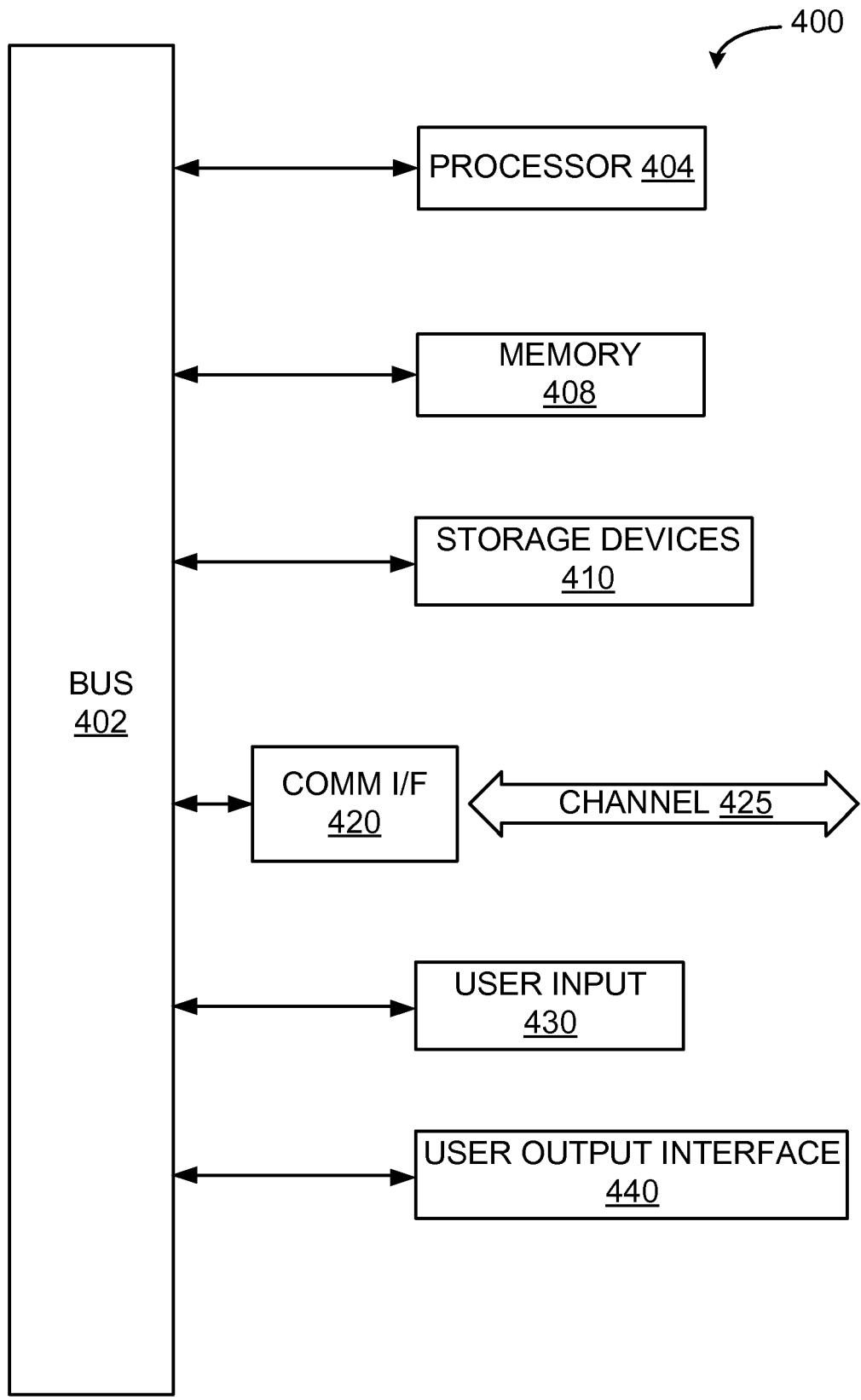
FIG. 4 illustrates a sample computing module that may be used to implement certain features and embodiments of the present disclosure.

Referring now to FIG. 4, computing module 400 may represent, for example, computing or processing capabilities found within desktop, laptop and notebook computers; hand-held computing devices (PDA's, smart phones, cell phones, palmtops, tablets, etc.); or any other type of special-purpose or general-purpose computing devices as may be appropriate. Computing module 400 might also represent computing capabilities embedded within or otherwise available to a given device. For example, a computing module might be found in other electronic devices such as, for example, televisions, home theaters, Blu-Ray disc players, DVD players, in-car entertainment systems, video game consoles, video download or streaming devices, portable DVD players and other electronic devices that might include some form of processing capability.

Computing module 400 might include, for example, one or more processors, controllers, control modules, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing module 400 or to communicate externally.

Computing module 400 might also include one or more memory modules, simply referred to herein as main memory 408. For example, random access memory (RAM) or other dynamic memory might be used for storing information and instructions to be executed by processor 404. Main memory 408 might also be used for storing temporary variables or other intermediate information during execution of instructions to be executed by processor 404. Computing module 400 might likewise include a read only memory ("ROM") or other static storage device coupled to bus 402 for storing static information and instructions for processor 404. The computing module 400 might also include one or more various storage devices 410, which might include, for example, a magnetic tape drive, an optical disc drive, a solid state drive, removable storage media such as a CD or DVD, or any other non-volatile memory.

Computing module 400 might also include a communications interface 420. Communications interface 420 might be used to allow software and data to be transferred between computing module 400 and external devices. Examples of communications interface 420 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 420 might typically be carried on signals, which can be electronic, electromagnetic (which includes optical) or other signals capable of being exchanged by a given communications interface 420. These signals might be provided to communications interface 420 via a channel 425. This channel 425 might carry signals and might be implemented using a wired or wireless communication medium. Some examples of a channel might include a phone line, a cellular link, an RF link, an optical link, a network interface, a local or wide area network, and other wired or wireless communications channels.

Computing module 400 might also include one or more user inputs 430. The user input allows for the user to enter commands to the computing module 400 and interact with it. Examples of user inputs might include a computer mouse, a keyboard, a touch-sensitive screen, a stylus, a mousepad, a joystick, an accelerometer, a gyroscope, a camera, a remote control, or any other user input mechanism.

The computer module 400 might also include one or more user output interfaces 440. The user output interfaces 440 might be used to interact with the user by presenting information or sensory outputs for the user. Examples of user output interfaces might include visual outputs, such as a display screen or monitor, or audio outputs, such as a speaker or headphone output.

In this document, the terms "computer readable medium" and "computer usable medium" are used to generally refer to media such as, for example, memory 408, storage unit 410, and channel 425. These and other various forms of computer readable media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 400 to perform features or functions of the present disclosure as discussed herein.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features. Additionally, with regard to flow diagrams, operational descriptions and method claims, the order in which the steps are presented herein shall not mandate that various embodiments be implemented to perform the recited functionality in the same order unless the context dictates otherwise. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Although the disclosure has been presented with reference only to the presently preferred embodiments, those of ordinary skill in the art will appreciate that various modifications can be made without departing from this disclosure. As such, the disclosure is defined only by the following claims and recited limitations.

The invention claimed is:

1. A method comprising:
selecting, using scheduling factor data, a plurality of movies, shows, or a combination thereof from a set of available movies, shows, or a combination thereof, wherein the scheduling factor data are based on at least one of a social media activity of a first user or one or more products identified as being present in an environment of the first user;
selecting, using the scheduling factor data, a different scheduled time of a day for each of the plurality of movies, shows, or the combination thereof;
populating a custom channel, for the first user, with the plurality of movies, shows, or the combination thereof arranged according to the different scheduled time of the day for each of the plurality of movies, shows, or the combination thereof;
continuously transmitting, over the custom channel, the plurality of movies, shows, or the combination thereof, according to the different scheduled time of the day for each of the plurality of movies, shows, or the combination thereof; and
presenting to the first user, when a first movie or show of the plurality of movies, shows, or the combination thereof is being currently transmitted over the custom channel, an option to View the first movie or show from a beginning of the first movie or show.

2. The method of claim 1, further comprising:
detecting a second user in the environment; and
wherein, in response to detecting the second user in the environment, selecting the plurality of movies, shows, or the combination thereof further comprises using second scheduling factor data corresponding to the second user, and selecting the different scheduled time of the day for each of the plurality of movies, shows, or the combination thereof further comprises using the second scheduling factor data corresponding to the second user.

3. The method of claim 1, wherein the set of available movies, shows, or the combination thereof comprises movies or shows from a specific television network, movies or shows from every television network to which the first user is subscribed, movies or shows owned by the first user, or a combination thereof.

4. The method of claim 1, further comprising:
receiving updates to the scheduling factor data; and
dynamically populating the custom channel based on the updates to the scheduling factor data.

5. The method of claim 1, further comprising:
receiving, from the first user, a selection of the option to view the first movie or show from the beginning over the custom channel;
in response to receiving the selection, starting to transmit the first movie or show from the beginning for viewing by the first user; and
re-populating the custom channel based on the selection.

6. The method of claim 1, wherein the scheduling factor data are based on the one or more products identified as being present in the environment of the first user.

7. The method of claim 1, wherein the scheduling factor data further comprise an outcome of a sports event.

8. The method of claim 1, wherein the scheduling factor data are further based on third party data relating to a prior online viewing of additional products by the first user.

9. The method of claim 1, wherein RFID or NFC is used for determining that the one or more products are present in the environment of the first user.

10. A non-transitory computer readable medium comprising an instruction set configured to cause a computing device to perform:
selecting, using scheduling factor data, a plurality of movies, shows, or the combination thereof from a set of available movies, shows, or the combination thereof, wherein the scheduling factor data are based on at least one of a social media activity of a first user or one or more products identified as being present in an environment of the first user;
selecting, using the scheduling factor data, a different scheduled time of a day for each of the plurality of movies, shows, or the combination thereof;
populating a custom channel with the plurality of movies, shows, or the combination thereof arranged according to the different scheduled time of the day for each of the plurality of movies, shows, or the combination thereof;
continuously transmitting, over the custom channel, the plurality of movies, shows, or the combination thereof, according to the different scheduled time of the day for each of the plurality of movies, shows, or the combination thereof; and
presenting to the first user, when a first movie or show of the plurality of movies, shows, or the combination thereof is being currently transmitted over the custom channel, an option to view the first movie or show from a beginning of the first movie or show.

11. The non-transitory computer readable medium of claim 10, wherein the instruction set is further configured to cause the computing device to perform:
detecting a second user in the environment; and
wherein, in response to detecting the first user and the second user in the environment, selecting the plurality of movies, shows, or the combination thereof further uses second scheduling factor data corresponding to the second user, and selecting the different schedule time of the day for each of the plurality of movies, shows, or the combination thereof further uses the second scheduling factor data corresponding to the second user.

12. The non-transitory computer readable medium of claim 10, wherein the set of available movies, shows, or the combination thereof comprises movies or shows from a specific television network, movies or shows from every television network to which the first user is subscribed, movies or shows owned by the first user, or a combination thereof.

13. The non-transitory computer readable medium of claim 10, wherein the instruction set is further configured to cause the computing device to perform:
receiving updates to the scheduling factor data; and
dynamically populating the custom channel based on the updates to the scheduling factor data.

14. The non-transitory computer readable medium of claim 10, wherein the instruction set is further configured to cause the computing device to perform:
receiving, from the first user, a selection of the option to view the first movie or show from the beginning over the custom channel;
in response to receiving the selection, starting to transmit the first movie or show from the beginning for viewing by the first user; and re-populating the custom channel based on the selection.

15. The non-transitory computer readable medium of claim 10, wherein the scheduling factor data are based on the one or more products identified as being present in the environment of the first user.

16. The non-transitory computer readable medium of claim 10, wherein the scheduling factor data further comprise an outcome of a sports event.

17. The non-transitory computer readable medium of claim 10, wherein the scheduling factor data are further based on third party data relating to a prior online Viewing of additional products by the first user.

18. The non-transitory computer readable medium of claim 10, wherein RFID or NFC is used for determining that the one or more products are present in the environment of the first user.

* * * * *